US011015680B2

(12) United States Patent
Yu et al.

(10) Patent No.: US 11,015,680 B2
(45) Date of Patent: May 25, 2021

(54) WEDGE PIN SUSPENSION SYSTEM

(71) Applicant: Vode Lighting, LLC, Sonoma, CA (US)

(72) Inventors: Scott Yu, Tiburon, CA (US); Richard Wong, Sonoma, CA (US)

(73) Assignee: VODE LIGHTING, LLC, Sonoma, CA (US)

( * ) Notice: Subject to any disclaimer, the term of this patent is extended or adjusted under 35 U.S.C. 154(b) by 444 days.

(21) Appl. No.: 16/189,152

(22) Filed: Nov. 13, 2018

(65) Prior Publication Data
US 2020/0149611 A1 May 14, 2020

(51) Int. Cl.
*F21V 23/00* (2015.01)
*F16G 11/10* (2006.01)
*F21V 21/008* (2006.01)
*F16G 11/00* (2006.01)

(52) U.S. Cl.
CPC ............ *F16G 11/105* (2013.01); *F16G 11/00* (2013.01); *F21V 21/008* (2013.01); *F21V 23/001* (2013.01)

(58) Field of Classification Search
CPC .... F21V 23/001; F21V 23/0083; F16G 11/00; F16G 11/05
See application file for complete search history.

(56) References Cited

U.S. PATENT DOCUMENTS

| 4,507,008 | A  | * | 3/1985 | Adi ........................ | F16G 11/05 |
|           |    |   |        |                             | 174/89     |
| 2014/0218925 | A1 | * | 8/2014 | Han ....................... | F21V 23/06 |
|           |    |   |        |                             | 362/249.14 |
| 2016/0178146 | A1 | * | 6/2016 | Oleske .................... | E04B 9/006 |
|           |    |   |        |                             | 52/28      |
| 2020/0108436 | A1 | * | 4/2020 | Campbell ............... | B21F 9/002 |

* cited by examiner

*Primary Examiner* — Anne M Hines
(74) *Attorney, Agent, or Firm* — Michael Petrin; AT & P, PC (57) ABSTRACT

The present disclosure relates to a means for vertically suspending a single lighting element or a plurality of lighting elements within a rail system using one or a plurality of wedge pin suspension systems that employ a wedge pin securing device and a receptive collar assembly to grip and secure in place one or a plurality of electrical cables having at least two insulated conductive electrical leads to provide both vertical support and electrical power to the suspended lighting elements. The present disclosure further relates to a manually adjustable and reservable wedge pin securing device configured for easy manipulation, yet providing a secure vertical suspension means using a lighting system's own electrical cable for support based on combined frictional and gravitational forces.

20 Claims, 8 Drawing Sheets

WEDGE PIN SUSPENSION SYSTEM

BACKGROUND

The present disclosure relates generally to a wedge pin suspension system featuring a removable wedge pin element and receptive collar assembly. The present disclosure further relates to a means for vertically suspending a single lighting element or a plurality of lighting elements within a rail system using one or a plurality of wedge pin suspension systems that employ a wedge pin element and a receptive collar assembly to grip and secure in place one or a plurality of electrical cables having at least one insulated conductive electrical lead or wire to provide both vertical support and electrical power to the suspended lighting elements. The present disclosure further relates to a manually adjustable and removable wedge pin element configured for easy placement, manipulation and removal, yet providing a secure vertical suspension means using a lighting system's own electrical cables for support based on combined frictional and gravitational forces.

Many indoor lighting systems use some means of suspension by cable, either a wire, braided wire or solid rod to provide a hanging or suspension means, or by employing the electrical cable itself for support. The braided nature and construction of most electrical cables lend themselves to act as support means owing to their high tensile strength and flexibility, while not stretching or breaking under moderate weight or load. In these typical configurations, the electrical cable is secured by means of a grommet and knot in the electrical cable itself, or the cable is secured by a fastener, such as for example a means pinches the electrical cable between a plate and retaining element tightened by a screw or similar means to apply an external pressure to the electrical cable to prevent its movement or displacement. This approach works but requires the use of a screw driver or wrench to tighten the fastener and suffers from the fact that the pinching means can compromise the outer insulating sheath of the electrical cable, increasing the possibility of damage resulting in electrical shorts or breakage. Most importantly, if suspended by such means, the weight of the suspended lighting element acts to focus the full weight, and hence stress, on the electrical cable as secured by the fastener, which are not presently designed to either absorb or dissipate that stress and so tends to transfer the stress to that portion of the electrical cable just near the point its secured. Most significantly, these common securing means enable to stress to be applied non-axially to the cable, so that the stress is directed sideways, perpendicular to the axis of the cable and thus much more likely to cause damage to the outer sheath and inner metal wires of the electrical cable.

What is much more desirable is a suspension means that uses the electrical cable supplying power and electricity to a lighting system, but which is configured to absorb and dissipate all perpendicular stress so that the electrical cable is subject solely to vertical forces and stress along its axis of suspension only.

Accordingly, there is a need for a better suspension system that can secure a suspending lighting system or assembly using means that is radially symmetric about a center axis corresponding to the axis of the suspending electrical cables used to support the lighting system, wherein the suspension system limits all stress on the electrical cable solely to vertical stress along the axis of suspension.

SUMMARY

Disclosed herein is an embodiment of an inventive suspension system and means for employing a axially symmetric wedge pin insert and a receptive collar assembly to secure an electrical cable and lighting system suspended therefrom.

Also disclosed herein is an embodiment of an inventive cable suspension system for a light assembly comprising (a) a wedge pin; wherein the wedge pin consists of an upper leading taper section transitioning to a cylindrical body region transitioning to a tapered plug region transitioning to a lower bottom region; wherein the wedge pin has a center axis of rotation passing through a midpoint coincident to both the upper leading taper section and the lower bottom region, and extending along the length of the wedge pin; wherein the center axis coincides with a path of insertion of the wedge pin into a collar assembly; wherein the tapered plug region is in the form of a cone with a first diameter equal to the diameter of the cylindrical body region at the junction between the tapered plug region and the cylindrical body region, and a second diameter at a distal end of the tapered plug region larger than the first diameter; (b) a collar assembly; wherein the collar assembly consists of a collar portion attached to a collar yoke portion; wherein the collar portion is hollow with an upper cylindrical bore capable of accommodating one or plurality of electrical cables; wherein the electrical cables optionally have one or a plurality of wire conductors; wherein the collar yoke portion has a tapered conical bore capable of receiving and accommodating the one or plurality of electrical cables and the wedge pin; wherein the wedge pin secures the one or plurality of electrical cables within the collar assembly when inserted therein; and (c) optionally, a light assembly; wherein the light assembly connects to the collar yoke portion of the collar assembly.

Also disclosed herein is an embodiment of an inventive cable suspension system wherein the upper leading taper section of a wedge pin is configured in a shape selected from a semi-hemisphere, tapered cone, semi-ovoid, rounded end, chambered end and radiused end, in order to provide a low friction and low abrasion surface for insertion of the wedge pin into and between the wire conductors or electrical leads of an electrical cable.

Also disclosed herein is an embodiment of an inventive cable suspension system wherein the cylindrical body region of the wedge pin is configured in a shape selected from a straight cylinder, gradually tapered cylinder, rod and the like.

Also disclosed herein is an embodiment of an inventive cable suspension system wherein the outer surface of the cylindrical body region of the wedge pin features one or a plurality of raised surface features selected from a screw thread, multiple screw threads, interrupted screw threads, raised compression ribs, raised compression bumps, and combinations thereof; wherein the heights of the raised surface features above the surface of the cylindrical body region are less than or equal to a distance corresponding to one half the outer diameter of at least one wire conductor of at least one of the electrical cables.

Further, the present disclosure describes an embodiment of an inventive cable suspension system wherein the heights of the raised surface features above the surface of the cylindrical body region do not exceed a distance corresponding to the inner diameter of the upper cylindrical bore.

Also disclosed herein is an embodiment of an inventive cable suspension system wherein the cylindrical body region of the wedge pin features at least one of the raised surface features positioned at a midpoint along the cylindrical body region. In a closely related embodiment of the present disclosure is a cable suspension system wherein the cylindrical body region of the wedge pin features at least two of the raised surface features, equally spaced from one another and equally spaced from the top and the bottom of the cylindrical body region. In another closely related embodiment of the present disclosure is a cable suspension system wherein the cylindrical body region of the wedge pin features a plurality of the raised surface features equally spaced from one another and equally spaced from the top and the bottom of the cylindrical body region.

In a closely related embodiment of the present disclosure is a cable suspension system wherein the wedge pin features a tool insert region located within the tapered plug region and having a tool access opening facing downward and outward from the lower bottom region and wherein the tool access opening is capable of receiving a tool or tool insert. In these embodiments, the inventive disclosure includes a tool insert selected from a threaded insert, plug insert, friction fit insert or molded insert; wherein the tool insert is capable of receiving a tool selected from a screwdriver, Allen™ wrench, threaded bolt, threaded rod, twist pin, T-bar wrench, or the like; and wherein the tool may be inserted into the tool insert region in order to reversibly engage the wedge pin during an insertion, adjustment or removal operation.

In yet another related embodiment of the present disclosure is a cable suspension system wherein the collar portion features a cylindrical bore opening capable of accommodating one or a plurality of electrical cables; wherein the collar portion transitions to the top of the tapered plug region; wherein the interior of the tapered plug region is capable of simultaneously receiving the one or a plurality of electrical cables and receiving the top end of the wedge pin; wherein an optional collar yoke portion attaches to either the collar portion or the tapered plug region of the collar assembly.

Also disclosed herein is an embodiment of an inventive cable suspension system of wherein the collar yoke portion attaches to an outside surface or edge of the collar assembly at any one or plurality of positions thereon. In a closely related alternative embodiment, the collar yoke portion is integrally formed with the collar assembly as a single unit; wherein the collar yoke portion is optionally configured in the form of one or a plurality of flanges located at any position on the outside surface or edge of the collar assembly at any one or plurality of positions thereon.

Also disclosed herein is an embodiment of an inventive cable suspension system of wherein the upper cylindrical bore has a surface finish selected from a dimpled, smooth, grooved, knurled and textured surface, in order to increase frictional forces with the one or plurality of electrical cables or one or plurality of wire conductors to prevent slippage or movement of the cables or conductors when in place.

Also disclosed herein is an embodiment of an inventive cable suspension system featuring: (a) a collar assembly having a cylindrical body region, a tapered plug region and a collar yoke portion; (b) wedge pin; and (c) suspended rail assembly; wherein the suspended rail assembly is reversibly attached to the collar assembly by means of the collar yoke portion; and wherein the collar assembly attaches to one or a plurality of vertically oriented and suspended electrical cables by means of the wedge pin being inserted between the one or plurality of wire conductors of the one or plurality of electrical cables within a compression zone located at the junction between the cylindrical bore opening and the top of the tapered plug region.

Also disclosed herein is an embodiment of an inventive cable suspension system wherein the suspended rail assembly comprises a light assembly having a least one light source selected from an LED, LED array, laser diode, OLED, incandescent lamp, fluorescent lamp, or combinations thereof.

In a further related embodiment of the present disclosure is a cable suspension system wherein the suspended rail assembly further features at least one or a plurality of lens elements located on any side, top or bottom portion of the suspended rail assembly.

Also disclosed herein is an embodiment of an inventive wedge pin wherein the body of the wedge pin comprises a metal selected from any metallic element, semi-metallic element, alloy, compound or mixture thereof; and wherein the wedge pin features an optional surface coating of a resilient non-conductive material selected from plastic, polymer, resin, Telfon or the like.

Contemplated herein is an embodiment of the inventive disclosure describing a method and means for vertically suspending a light assembly using the wedge pin to secure one or a plurality of suspended electrical cables inside the collar assembly; wherein the light assembly connects to an outer surface or edge of the collar assembly; and wherein one or a plurality of the wire conductors of the one or plurality of the electrical cables supply electricity to the light assembly.

Also contemplated herein is an embodiment of the inventive disclosure describing a method and means for vertically suspending a light assembly using a wedge pin to engage and secure a suspended electrical cable inside the collar assembly; wherein the wedge pin features a tool insert region located within the tapered plug region and having a tool access opening facing downward and outward from the lower bottom region capable of receiving a tool or tool insert; and using a tool to access the tool access opening to engage and secure the wedge pin during an operation to either insert, adjust or remove the wedge pin with respect to the collar assembly.

These preceding example embodiments of the inventive disclosure are described in further detail and in additional related embodiments having one or more of the disclosed features and means of achieving the objects of the invention.

A corresponding Key detailing the specific component parts, regions and means of the present disclosure are included in the Appendices to accompany each of the above Figures.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Read this application with the following terms and phrases in their most general form. The general meaning of each of these terms or phrases is illustrative, not in any way limiting.

Detailed Description

The various Figures and discussion presented below represent non-limiting examples of the present disclosure presented in a series of embodiments with both essential features as well as optional features that are within the scope of invention.

Figure 1:
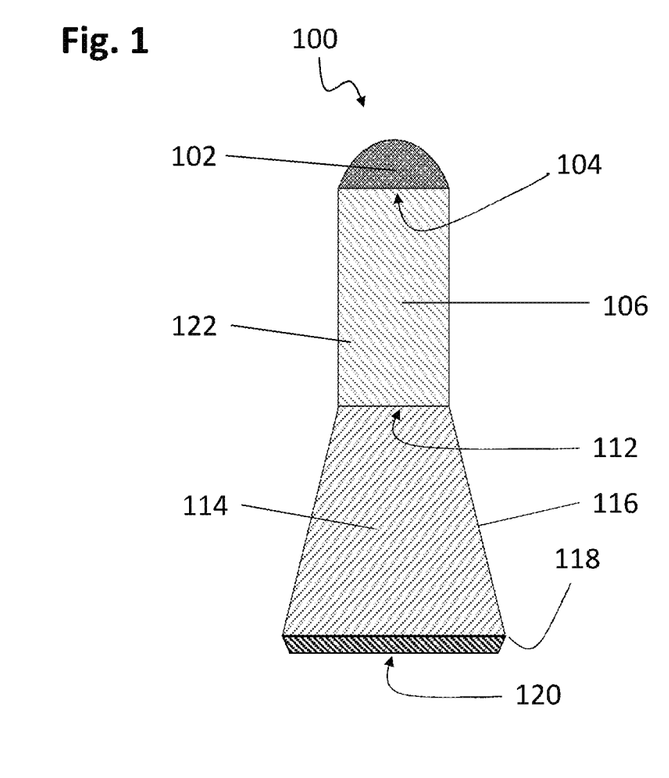
FIG. 1 shows one embodiment of a suspension wedge pin with a rounded upper section with a smooth cylindrical barrel and tapered plug section with tapered bottom.

FIG. 1 shows one embodiment of a wedge pin element 100 of the inventive wedge pin suspension system, wherein the wedge pin 100 is generally in the shape of a partially tapered cylinder with a cylindrical body region 106 transitioning through a middle or mid transition region 112 to a tapered plug region 114. The uppermost or leading taper section 102 transitions through a top transition region 104. In this embodiment, the leading taper section 102 is round in profile, presenting a smooth surface for insertion of the wedge pin into its receptive collar assembly (to be described in detail below) without damaging the collar or electrical cables into which it will come into contact when emplaced.

The embodiment shown in FIG. 1 also features a smooth outer cylindrical surface 114 for the cylindrical body region 106, as well as a smooth tapered outer surface 116 for the tapered plug region 114. On the bottom of this wedge pin 100 embodiment, the tapered plug region 114 features a chambered edge 118 leading to the bottom face of the wedge pin, or bottom region 120, whose edge is tapered slightly away from the chambered edge 118 to provide relief.

The inventive embodiment shown in FIG. 1 shows a basic configuration of the wedge pin element of the wedge pin suspension system, and many variants are possible within the scope of invention. For example, a related embodiment is shown as an example in FIG. 2, where the wedge pin 200 has two additional raised compression ribs 208 present and equally spaced along the cylindrical body region 206 of the wedge pin. In this embodiment, a plurality of raised compression ribs 208, 208' protrude above the cylindrical body surface 222 of the cylindrical body region 206 to form two rib surfaces 210 that are smooth in contour and transition smoothly from their peak (maximum height or width) to the cylindrical body surface 222 without any break or gap, enabling them to exert more focused compression forces on the suspending cable as shown below in further figures and accompanying discussion. Although two ribs are shown in this embodiment, other inventive embodiments are contemplated having one rib, positioned at any point along the cylindrical body region 221, or alternatively three of more ribs positioned at any point, or alternatively, positioned by even spacing, along the cylindrical body region 221. Preferably, the top rib surfaces 210 or crowns are smooth in contour or at the minimum are sufficiently smooth, radiused or tapered so as not to abrade the coating or insulating layer of an electrical cable coming into close compressive contact therewith. The number and relative positioning of the one or more raised compression ribs 208 are arbitrary and include any number of compression ribs 208 or similarly raised protrusions (not shown) of between 1 and about 6, when a rib is employed. These can be equally spaced or spaced in any desired pattern with any desired spacing along the cylindrical body region 206 of the wedge pin 200.

Figure 2:
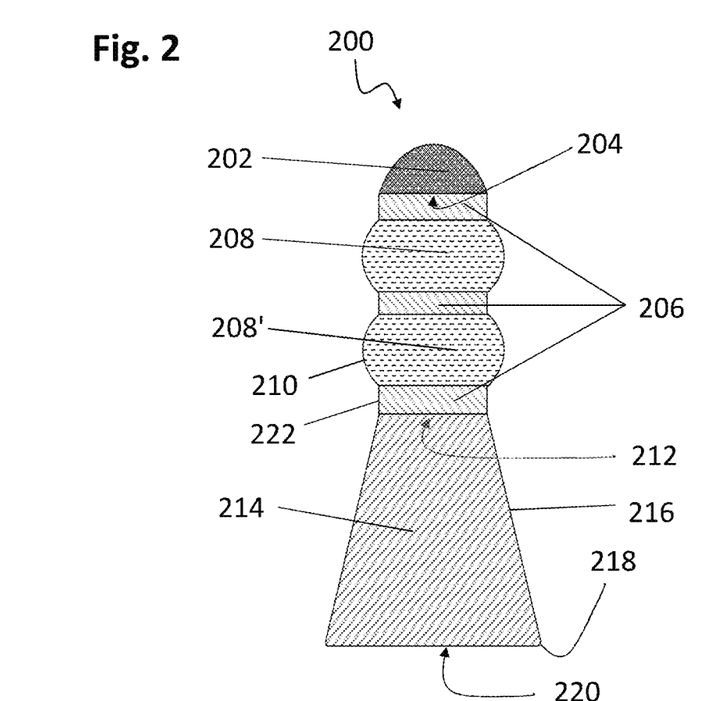
FIG. 2 shows one embodiment of a suspension wedge pin with a rounded upper section with a ribbed cylindrical barrel and tapered plug section with a flat bottom.

In the embodiment shown in FIG. 2, the wedge pin 200 features a bottom region 220 that transitions through a moderately chambered edge 218 to the lower portion of the tapered plug region 214.

FIG. 2 also shows a diagrammatic representation of the various dimensions, sizes, lengths and widths of the various regions or portions that comprise the wedge pin. Most notably, the wedge pin is axially symmetric about a center axis, shown, that passes through the center of the pin from the apex or top of the leading taper section 202 and the center of the pin at the bottom region 220. Also shown in FIG. 2 (right) is an interior space with length L and internal diameter or width K that represents a bored region that is receptive to a coupling element for use with a tool to provide ease in the insertion and removal of the wedge pin element into and out of the tapered collar section (not shown) of the wedge pin suspension system.

In FIG. 2 (right), the dimensions shown correspond to the following: A is the height of the leading tapered section 202, B is the length of the cylindrical body region 206, C is the length of the tapered plug region 214, D is the height of the optional bottom region 220, E is the width or outer diameter of the top transition region 204, F is the height of one or a plurality of ribs with respect to the cylindrical body region 206, G is the spacing from the edge of the top transition region 204 to the apex or maximum height or rib surface 210 of the first raised compression rib 208, H is the distance between a first and second raised compression rib 208 and 208', I is the length or width of any one particular raised compression ribs 208, 208', 208" (not shown), J is the width or maximum diameter of the chambered edge 218 of the lower bottom region 220 of the wedge pin, and K and L are the respect internal bore diameter and depth of an optional tool insert region of the wedge pin.

In practice, the various dimensions, widths, heights, spacings and diameters of the respective elements, regions, portions and transitions of the instant inventive wedge pin can be any practical values, sized appropriately to the size of the electrical cable used to support a lighting system of a given mass or weight. Typically, for higher voltage or higher current load systems, the electrical cables used can span between 16-gauge wire to rather heavy 6-gauge wire, the wire generally selected to the next smallest gauge as required to meet voltage and current demands of the lighting system being supplied with electrical energy using one or more of the electrical cables. For larger cables (smaller gauge), a proportionally large wedge pin and wedge pin collar assembly is employed as the lighting systems drawing heavier electrical current and load are typically heavier in weight. However, with the advent of high-power LED (light emitting diodes) and similar non-incandescent (filament) and fluorescent (tube) based light sources, the overall current and power demands are lower, enabling the use of larger gauge (smaller) electrical cables owing to the lower weight of LED lighting systems compared to their older predecessors.

Accordingly, as shown in FIG. 2 (right) the various dimensions can span from fractions of an inch to multiple inches in size, depending on the gauge (size) of electrical cable used. The various dimensions can also depend on whether a single conductor electrical cable is used for an individual wedge pin collar assembly, or whether a dual or multiple conductor electrical cable is employed. In addition, one embodiment of the invention provides for a collar assembly that is fixed in size and yet can accommodate wedge pin elements of varying size, the size depending on either the gauge of the electrical cable employed, or based on a combination of the gauge and the number of conductors in the electrical cable, typically spanning either a single conductor (a single wire or pole) cable, dual (sufficient for DC and AC current having two wires or pole), triple (including a ground or third conductor for another purpose) or multiple conductor electrical cables capable of supplying a separate source of power to a plurality of separate lighting assemblies commonly suspended from the multiple conductor electrical cable using one or a plurality of wedge pin collar assemblies.

Figure 3:
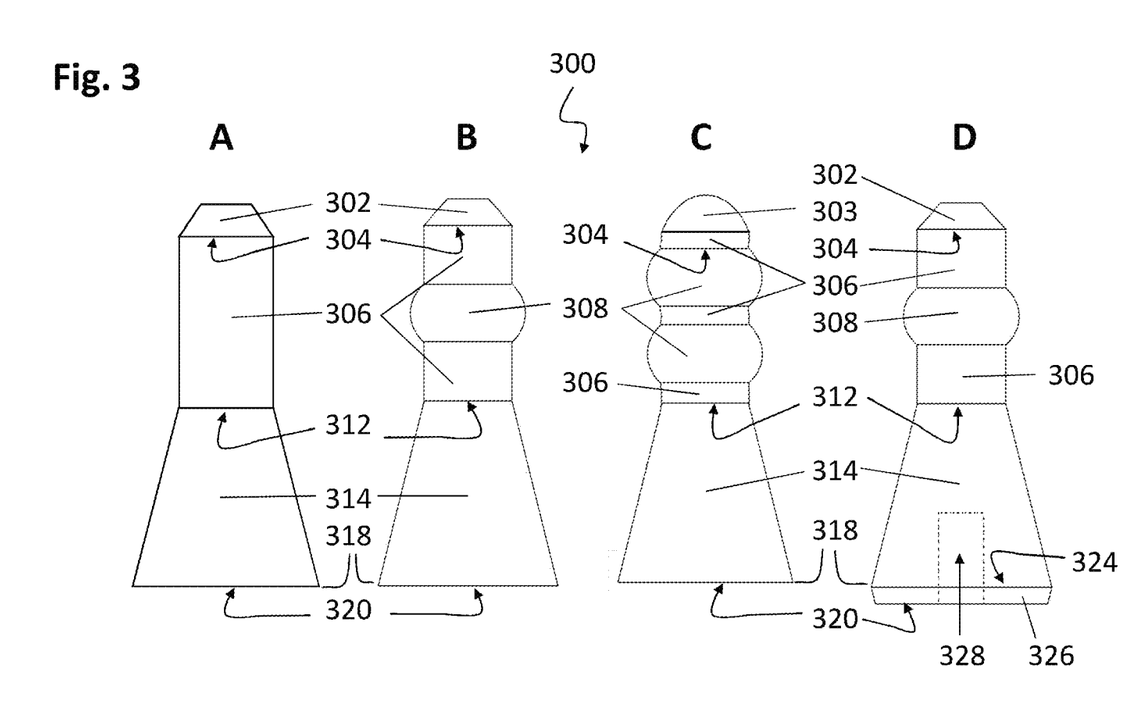
FIG. 3 shows a series of embodiments of the suspension wedge pin with rounded and tapered upper sections and with both smooth and ribbed cylindrical barrels and tapered plug section with either a flat or tapered bottom having a tool insertion region.

FIG. 3 shows a variety of embodiments of the inventive wedge pin 300, including style A representing a smooth surfaced cylindrical body region 306 and tapered plug region 314 with a leading taper section 302 transitioning from the upper transition region 304, optionally chambered or radiused at the edge of the transition region 304. In another embodiment, style B, the wedge pin features a single raised compression rib 308 located about mid-height or mid-distance along the cylindrical body region 306. As will become apparent in further discussion below, the raised compression rib 308 acts to concentrate and focus compression forces against an electrical cable to improve vertical gripping strength of the assembled wedge pin collar assembly engaged with a vertically suspended electrical cable.

Also shown in FIG. 3 is an additional wedge pin 300 style C that features a rounded crown or leading rounded section 303 transitioning through an upper transition region 304 to the cylindrical body region 306. In this embodiment, style C features two raised compression ribs 308, 308' evenly spaced and separated along the length or height of the cylindrical body region 306, although the spacing and separation, as well as the height of the respective raised compression ribs 308 and 308' can be of any desired height, width, size and separation as needed. Styles A, B and C all feature a plain flat bottom region 320, but style D shows a bottom taper section 326 transitioning to the bottom region 320 through a bottom transition region 324 that may optionally be radius, chambered or rounded to prevent abrasion or damage to an electrical cable. The inventive embodiment shown in style D also features an internal hollow space or tool insert region 328 that can accommodate the insertion of a tool insert.

In other related embodiments, a wedge pin can feature a raised threaded feature such as for example, but not limited to a single helical style screw thread, alternatively being continuous or interrupted in sections, or alternatively being in the form of a dual or triple parallel helical style screw thread, also alternatively being all continuous or interrupted in sections. Any suitable angle or pitch of the threads or partial thread features is possible. In these related embodiments of the present disclosure, the insertion of a wedge pin having helical screw features is aided by the threaded features when the wedge pin is turned in the direction of the pitch of the threads, so that the wedge pin acts substantially like a screw and conversely the features aid in the removal or repositioning to the wedge pin when it is turned in the opposition direction of the pitch of the threads, facilitating its removal from the various combinations of wire conductors and collar assembly as disclosed herein.

In other related embodiments, a wedge pin according to the present disclosure can have any one or combination of features, options and styles are disclosed herein, provided that the wedge pin configuration includes at least an upper cylindrical body region and a lower tapered plug region.

Figure 4:
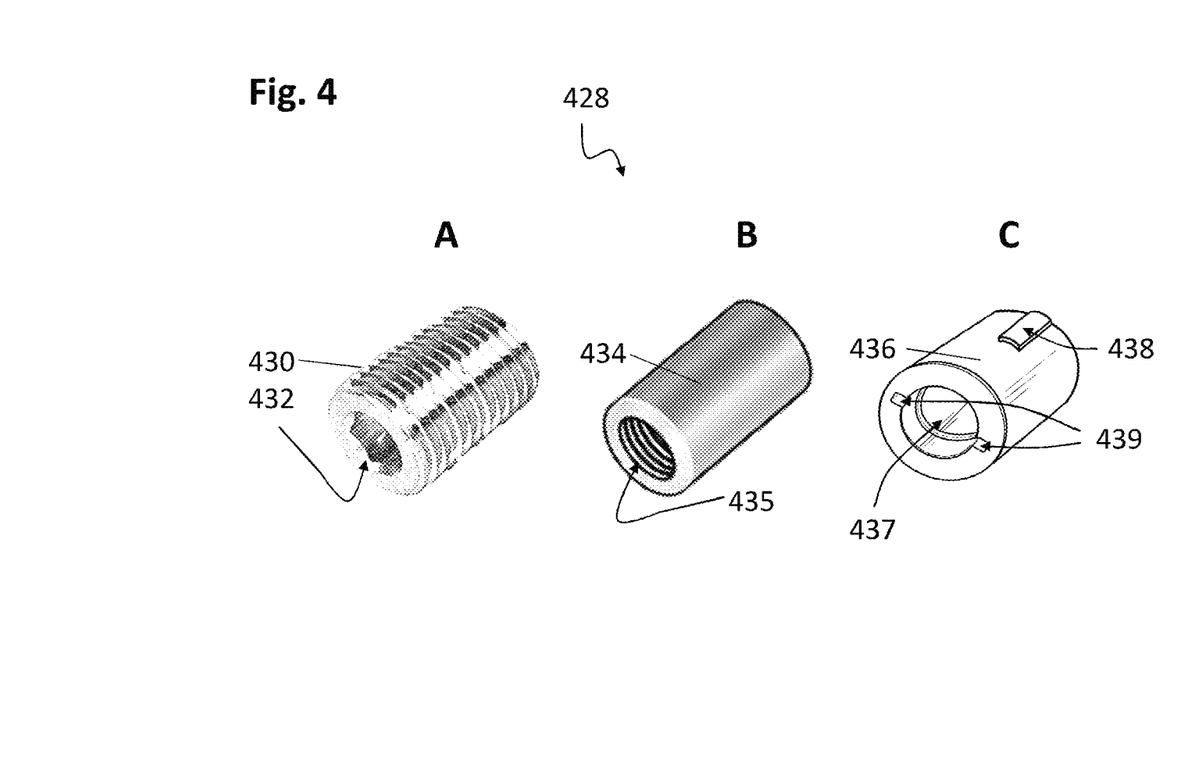
FIG. 4 shows a series of embodiments of tool inserts for use with and in emplacing and removing a suspension wedge pin.

FIG. 4 shows some example embodiments of a tool insert 428 that can be used with the inventive wedge pin embodiments that have a tool insert region present. Alternatively, one or more of the tool inserts A, B, C can be inserted in the tool insert region to provide a means for using a tool, such as an Allen™ wrench, screwdriver, threaded coupler, twist pin, or the like to engage with the tool insert for the purpose of handling the wedge pin during an insertion, adjustment or removal operation with regard to placement into the receptive collar assembly. Three non-limiting examples are shown in FIG. 4, including tool insert style A featuring a threaded cylinder insert 434 having an Allen socket 432 suitable to receive an Allen™ wrench or hex key, the outer threads of 434 matching internal threads in a threaded tool insert region present in a wedge pin. Tool insert style B features a smooth outer cylindrical surface suitable for press fitting into a receptive bore in a tool insert region present in another wedge pin embodiment, providing a threaded bore receiver 435 that can receive a threaded portion of an insertion tool. In yet another embodiment, tool insert style C provides a twist pin insert 436 that features a smooth outer cylindrical surface with a securement tang or twist pin insert tag 438 that acts to hold the twist pin insert 436 inside a receptive bore of a tool insert region of a wedge pin by friction and compression means following press fitting. Style C also features a twist pin socket 437 with two opposed twist pin socket guides 439 that direct the insertion of a twist pin tool (also referred to as an auto pin dowel) into the twist pin socket 437, followed by rotation of the twist pin tool (not shown) to lock it into position within the twist pin socket 437 to enable manipulation of the wedge pin featuring this twist pin insert 436. In this embodiment, either a single pin (spring loaded ball bearing) or a dual pin (spring loaded dual opposed ball bearings) style twist pin tool can be used. Alternatively, a regular non-auto pin dowel that has one or more non-retractable pins mounted on the shaft of the twist pin tool can be employed by insertion and turning to lock in place, removed by turning in the opposite direction or until the pins align with the twist pin socket guides 439 to enable insertion of the tool into the twist pin socket 427, followed by twisting to engage the tool inside the twist pin insert, followed by manipulation or removal of the wedge pin. In other related embodiments, other tool inserts may be used provided that they are either formed into or are readily insertable and retained within a tool insert region formed on the bottom or distal end of a wedge pin, and act to enable manipulation of the wedge pin during an insertion, adjustment or removal operation of the wedge pin into and out of the corresponding collar assembly. In these and related embodiments, the use of an insertion tool and wedge pin with a tool insert or corresponding tool insertion region offers the advantages of easy handling and manipulation of the wedge pin.

Figure 5:
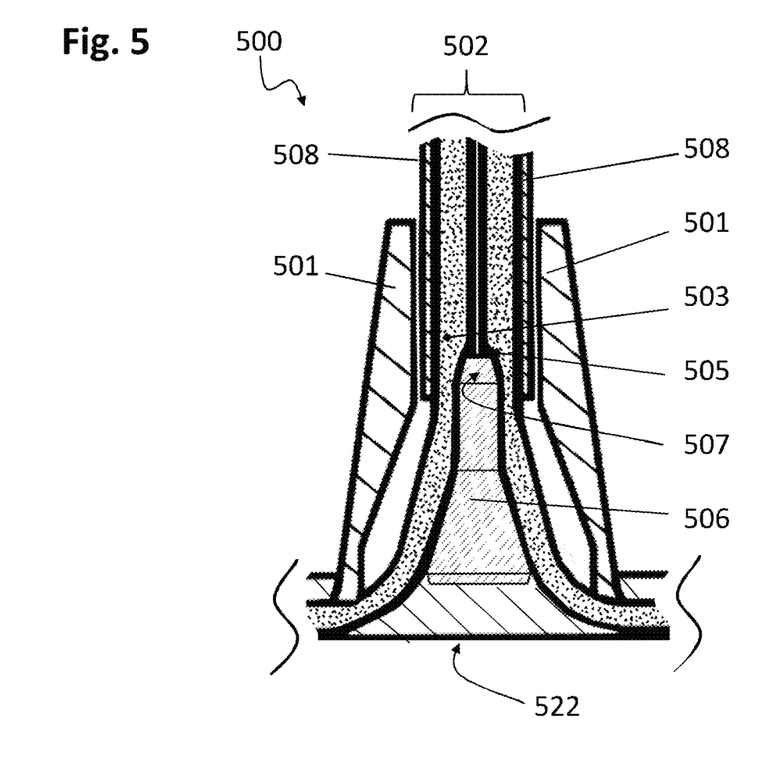
FIG. 5 shows a cross-sectional view of one embodiment of a wedge pin and collar assembly with electrical cables secured with a wedge pin.

FIG. 5 shows an additional element of the inventive disclosure in the form of one embodiment of a combined wedge pin and collar assembly 500 which features the wedge pin 506 shown inserted into the receptive collar 501. The collar 501 features an internal channel having an upper interior linear bore region and a lower interior tapered bore region that act to accommodate one or a plurality of electrical cables 502, here a singular cable 502 having two wires A (503) and B (505) partially surrounded by the cable sheath 508. The wedge pin insert 506 secures the electrical cable 502 in place by providing compression against the upper interior linear bore region of the collar 501 at the junction of this upper region and the lower interior tapered bore region at the point corresponding to the cable compression zone 507. This compression force exerted by the wedge pin insert 506 acts to hold the two wires A, B in place, with the additional frictional forces between the outer surface of the electrical cable sheath 508 and the interior bore of the upper interior linear bore region of the collar 501 further acting to hold the electrical cable 502 in place within the collar. As weight is applied to the collar 501, such as for example in this embodiment by means of the attached collar yoke portion 522 that is connected to a light or light rail assembly to be suspended, any downward motion of the collar assembly (501 and 522) acts to drive the wedge pin insert 506 further upward in the direction of the top bore of the collar 501, further compressing the electrical cable 502 in place against the upper interior linear bore region of the collar 501, preventing further motion or slippage. Due to the normally compressive nature of the electrical cable sheath materials, generally a non-conductive coating or layer of a rubber, rubber-like or elastomeric polymer, the electrical cable 502 acts as a compressible element in response to the compressive forces applied against it by the wedge pin 501 subject to the force of weight or gravity, so that it tends to be slightly springy in nature, thus wanting to decompress and return to its normal state when not under force, and so tending to remain in place after initial placement even if the weight is temporarily removed from the collar 501 and collar yoke 522 portion, such as during positioning, maneuvering an attached light fixture or light rail assembly or during changing of a LED or light source or light module.

Accordingly, in the inventive embodiment disclosed in FIG. 5, the wedge pin and collar assembly 500 functions to secure a light or light rail system by means of a vertically suspended electrical cable 502 by compressing a portion of that cable in a cable compression zone 507 present at the upper end of the wedge pin insert 506 as inserted into the collar 501 between the individual wires (A, 503 and B, 505) of the cable 502 which acts to compress both wires and the cable sheath 508 against the inner surface of the collar, the compressive force maintained through friction and gravitational forces acting upon the collar 501 by means of the weight of an attached light or light rail system (not shown) communicated to the collar 501 by means of the collar yoke portion 522 which serves as a means to attach the collar 501 to the light or light rail system, as illustrated in further example embodiments below. As weight is applied to the collar yoke portion 522, the downward force acts to pull down on the collar 501 with respect to the vertically suspended cable 502, acting to pull the electrical cable 502 upward in the direction of the upper opening or bore of the collar 501, which due to frictional forces acting on outside of the electrical cables 502 (i.e. the cable sheath 508) and frictional forces between the wedge pin insert 506 and the compressed wires A (503) and B (505) result in the wedge pin insert 506 being pulled deeper into the upper opening or bore portion of the collar 501, acting to further compress and secure the wedge pin and collar assembly 500 with respect to the electrical cable 502, so that they are vertically suspended therefrom.

To adjust the height of the suspended light or lighted rail system requires only the removal of the wedge pin insert 506 either manually or semi-manually with the use of a removal/insertion tool, followed by adjustment of the length or position of the collar 501 at the desired height or position with respect to a vertically suspended support cable, and then followed by re-insertion of the wedge pin as illustrated in FIG. 5 to re-secure the wedge pin and collar assembly 500 against the electrical cable 502. Accordingly, this enables easy and fast means to change the length or position of a suspended light or lighted rail system, and to re-secure the light at any desired height or position by simple re-insertion of the wedge pin 506 into the collar portion 501 of the assembly 500.

The collar 501 style shown in FIG. 5 as an example embodiment of the present disclosure is only one possible configuration, in general the collar portion of the wedge pin and collar assembly only requires a top opening sufficient to accommodate the insertion of one or more electrical cables (502) and a top portion featuring a cylindrical or round opening, bore or passage sized to accommodate the one or more electrical cables passing through this portion with just enough clearance to allow the movement of the electrical cables when desired, for example, during initial setup where the electrical cables are fed through the top opening into the collar, during adjustment of the suspended wedge pin and collar assembly and during removal of the electrical cable from the collar assembly. Generally, the lower portion or substantially lower half of the collar is in the form of a tapered cylinder and open bell shaped cavity of sufficient size to enable the free ends of the one or more electrical cables and the wires therein sufficient room to move around the inserted wedge pin and then be positioned so as to pass through the bottom opening of the collar into some interior region of a suspended light or suspended lighted rail system to connect to the electronic portion or elements of the light or illumination source present within the suspended light or rail system.

Figure 6:
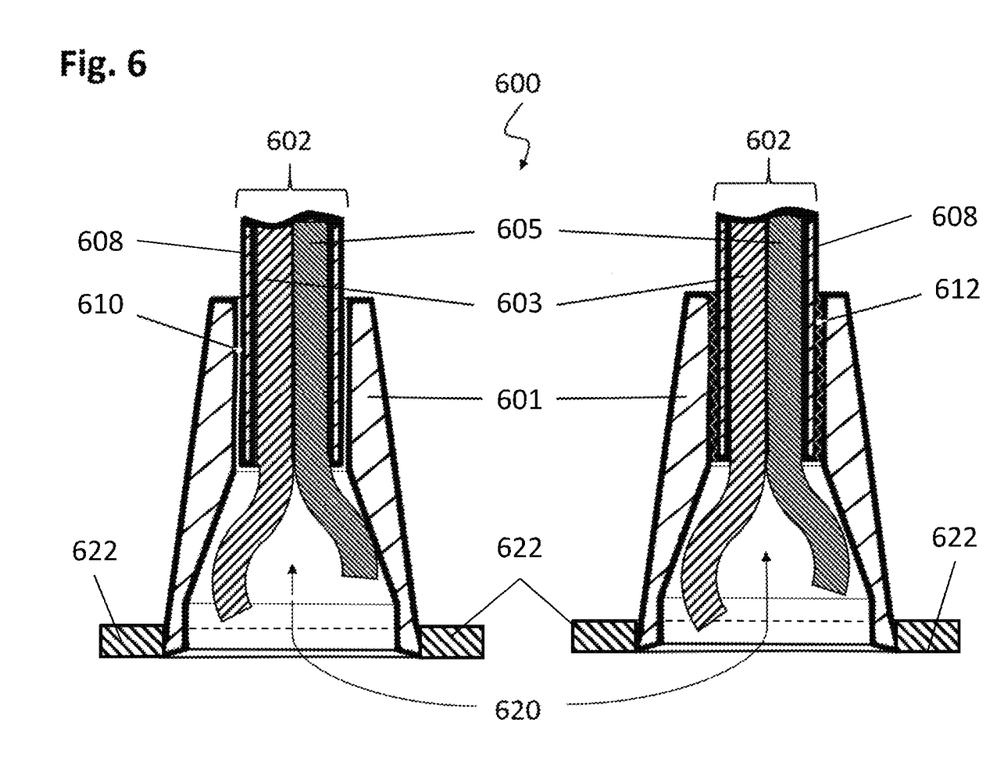
FIG. 6 shows cross-sectional views of two embodiments of a wedge pin and collar assembly with various cable guide surfaces.

FIG. 6 shows two additional embodiments of the collar assembly 600 of the instant disclosure. In the left drawing, the collar 601 features an upper cylindrical bore that receives the electrical cable 602 wherein the bore internal surface is smooth in texture, providing a smooth surfaced cable guide 610 region to enable the easy insertion and movement of the inserted electrical cable 602 therein. The two wires A and B (603 and 605) protrude from the electrical cable 602, the outer cable sheath 608 of 602 being removed and the end of the remaining sheathed portion of the electrical cable 602 being positioned approximately at the point of compression corresponding to the transition region in the collar 601 between the upper cylindrical bore portion and the lower bell portion as disclosed hereinabove. In FIG. 6, the wedge pin insert is not shown, representing a configuration just prior to its insertion in order to secure the electrical cable 602 to the collar 601.

In a second embodiment of a collar 601 shown in the right drawing of FIG. 6, the upper cylindrical bore that receives the electrical cable 602 features a textured surface cable guide 612 region that provides increased friction and grip between the outer side of the cable sheath 608 and the inner surface of the upper cylindrical bore to better secure the cable 602 in placed. Both embodiments shown in FIG. 6 also show another configuration of the attached collar yoke portion 622 that connects to the outside of the collar 601 to form the complete collar assembly 600 illustrated. In related embodiments, the collar yoke portion 622 can be attached by any means capable of securing it to any point on the outside, top or bottom of the collar 601, or alternatively can be formed as part of the collar 601 to form an integrated single-piece collar assembly 600. The function of the collar yoke portion 622 is to provide a means of attaching the collar 601 or an integrated collar assembly 600 to a light or lighted rail assembly (not shown here but see FIG. 8 hereinbelow) that is desired to be suspended using one or a plurality of the electrical cable 602 as a means of suspension for the light or lighted rail assembly. Accordingly, in further related embodiments according to the present disclosure, the collar assembly is itself formed into or is an integral part of the light or lighted rail assembly itself, rather than a separate unit attached thereto.

Figure 7:
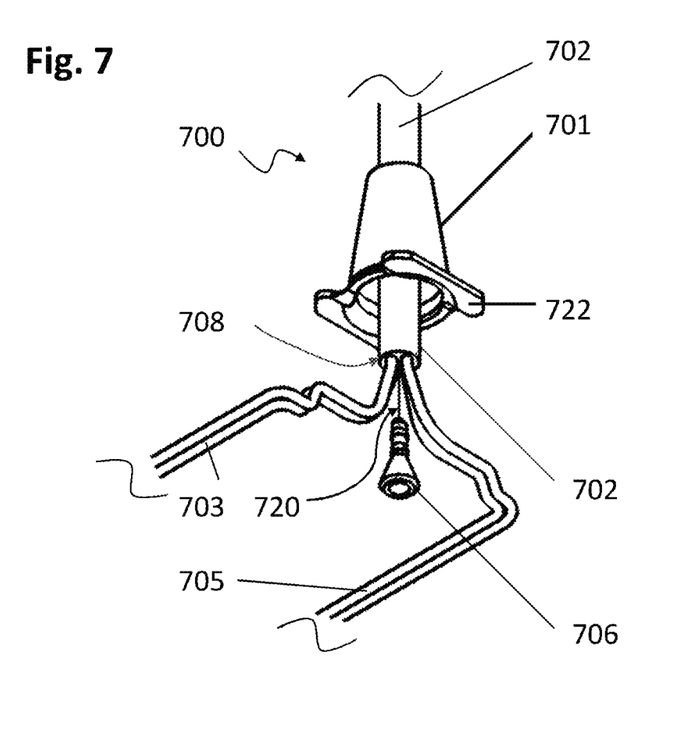
FIG. 7 shows an exploded view of one embodiment of a wedge pin, collar and collar yoke portion of a collar assembly prior to insertion of a wedge pin.

FIG. 7 shows an embodiment of the present disclosure featuring a collar assembly 700 composed of a collar 701 and collar yoke portion 722 attached to the lower end of the collar 701, representing the state or configuration of the wedge pin collar assembly with electrical cable 702 present but before the wedge pin 706 is inserted to lock the cable 702 in place. The electrical cable 702 is shown inserted into and through the upper end of the collar 701 so that the transition between the sheathed electrical cable 702 and the 'bare' or unsheathed separate dual wire conductors AB (703) and CB (705) are uncovered and free of the outer sheath of 702, although each of the wires AB and CD each have two (dual) wire conductors A and B, and C and D, respectively, that themselves have a non-conductive electrical sheath or coating around a center core of each example single wire or braided wire conductor. In FIG. 7, the insertion path of the wedge pin is shown by the line trace 720, representing the path and direction for insertion of the wedge pin into the approximate center region of the electrical cable 702 into the gap or space between the two dual wire conductors, this path essentially being coincident to the center axis of the vertically suspended electrical cable 702, and thus also coincident to the center axis of the upper bore of the collar assembly 700, as the electrical cable 702 remains centered within this upper bore of the collar 701 as the cable is pull up or conversely as the collar 701 is pull down, with respect to the other component being held in position. Following at least partial insertion of the wedge pin 706 into the electrical cable 702, the latter is pulled upward with respect to the collar 701, so that the electrical cable 702 is pulled upward into the receptive hollow cylindrical opening or bore in the upper portion of the collar 701, where the combination of the wedge pin 706 and now distended wires AB and CD are compressed into the opening within the compression zone (shown in FIG. 5 as 505) and act to secure the collar 701 to the electrical cable 702 and hold the relative position of both fixedly in place under the further force of gravity when a weight, light or lighted rail system is present to exert a gravitational force or pull on the collar assembly 700.

Figure 8:
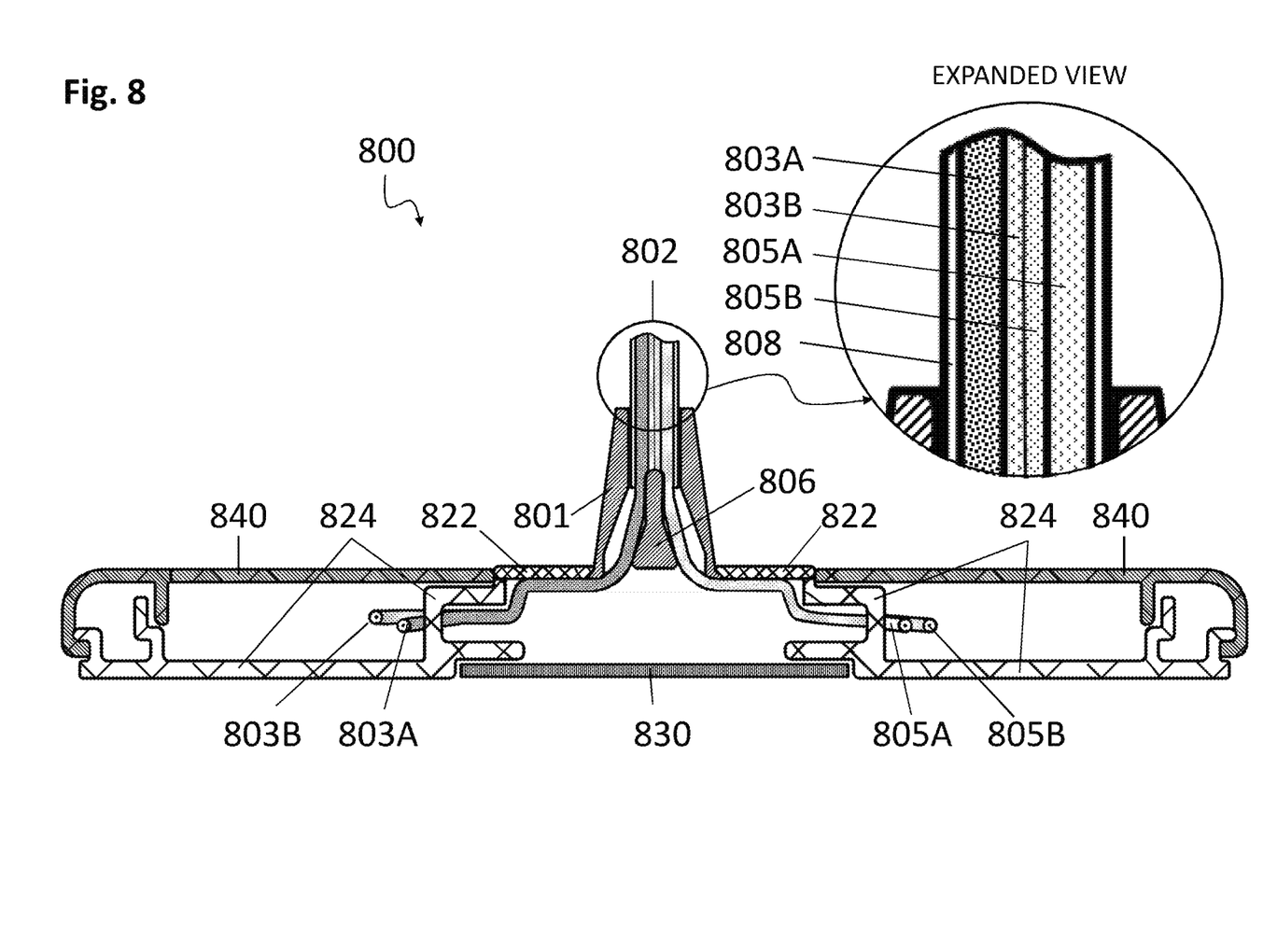
FIG. 8 shows a cross-sectional view of a suspended rail assembly secured by cable using one embodiment of a wedge pin, collar and collar yoke assembly attached to a rail assembly.

FIG. 8 shows one embodiment of a suspended light rail assembly 800 or basically any suspended rail assembly desired to be hung by means of the collar 801 or combined collar 801 and collar yoke 822 assembly. In this embodiment, a collar yoke 822 is attached to the collar 801 and serves as an attachment means to the top rail element 840 of the suspended rail assembly 800 by means of the lower rail panel 824 to which a top rail panel 840 attaches, the latter also featuring in this embodiment a lower lens element 830.

The electrical cable 802 in this embodiment has two dual conductor wires AB (803) and CD (805) each having two insulated individual wire conductors present for a total of four wires, 803A, 803B, 805A and 805B, which are shown passing into the interior of the suspended rail assembly formed by the top rail panel 840 and lower rail panel 824, wherein they would connect electrically to one or a plurality of LEDs or other source of illumination. In the embodiment of the instant disclosure shown in FIG. 8, the wedge pin 806 is shown inserted and secured within the lower portion of the collar 801 where it compresses the electrical cable 802 at the transition point between the lower portion and the upper portion of the collar 801, securing the electrical cable 802 in place and enabling the suspension of the entire rail assembly 800 by means of the electrical cable 802, which is secured at some vertical point above the suspended rail assembly 800, such as at an electrical junction box (not shown) or other means of holding and suspending the electrical cable 802 from a ceiling or overhead location.

As can be seen in this embodiment, the suspended rail assembly 800 is held in a stable position, but the height or position with respect to the rail assembly can be adjusted by first supporting the rail assembly by some means to hold it stationary while the wedge pin 806 is removed, followed by repositioning of the rail assembly 800 with respect to the position along the electrical cable 802 until the new desired position is approximately reached, and then followed by re-insertion of the wedge pin 806 into the collar 801 to re-secure the collar 801 and collar and collar yoke (combined 801 and 822 assembly) around the electrical cable 802. While only a single electrical cable 802 is used for suspending the rail assembly 800, additional numbers of electrical cables can be employed to suspend a larger or heavier rail assembly with one or a plurality of lights. This provides the advantages of greater versatility in controlling electrical supply to a series of separate lights or a series of lighted rails so as to separately control power to one or more LED or light sources located within the lighted rail, so that only the desired LED or light sources can be selectively or individually powered (turned on or turned off) as desired. Further, the advantage of the present disclosure provides for the suspension of a light or lighted rail system not requiring any other additional suspension means other than the use of the electrical cables used to provide power to the LED or light source of rail system. Additionally, a further advantage of embodiments of the present disclosure is the easy securement means and easy re-adjustment means enabled by the use of a wedge pin and receptive collar to secure a position along a vertically suspended cable or electrical cable.

Materials of Construction

The inventive wedge pin and collar assemblies of the present disclosure can be made of any suitable material and formed by any suitable manufacturing techniques. Suitable materials of construction include, but are not limited, to a metal, composite, alloy, polymer, resin, filled polymer composite, and the like. In addition, the wedge pin can alternatively be coated with a non-conductive coating or film so that the surface does not conduct electricity should it come into contact with a bare electrical lead. In a related embodiment to serve as a non-limiting example, an inventive wedge pin is constructed of a metal alloy and coated in whole or in part, being at least the upper portion cylindrical portion thereof, or alternatively the upper and lower tapered conical portion thereof, with an insulating material such as Teflon or similar non-conductive polymer, resin or coating.

Suitable manufacturing techniques by which the inventive components can be made or fashioned include injection molding, cast molding, machining, 3D-printing, and the like.

Appendix

This disclosure is accompanied by an Appendix with a corresponding Key accompanying the attached Drawings and Figures detailing the specific component parts, regions and means of the present disclosure.

The above illustration provides many different embodiments or embodiments for implementing different features of the invention. Specific embodiments of components and processes are described to help clarify the invention. These are, of course, merely embodiments and are not intended to limit the invention from that described in the claims.

One having skill in the art will appreciate that many variations are possible with respect to the invention contemplated as illustrated by the various embodiments, examples and options disclosed herein, and these variations and options are included within the inventive scope.

Although the invention is illustrated and described herein as embodied in one or more specific embodiments and examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and, in a manner, consistent with the scope of the invention, as set forth in the following claims.

APPENDIX

| DRAWING KEY | | |
|---|---|---|
| FIG. 1 | | |
| | 100 | Wedge pin |
| | 102 | Leading taper section |
| | 104 | Top transition region |
| | 106 | Cylindrical body region |

APPENDIX-continued

| DRAWING KEY | | |
|---|---|---|
| | 108 | Raised compression ribs |
| | 111 | Cylinder surface are |
| | 112 | Mid transition region |
| | 114 | Tapered plug region |
| | 116 | Tapered outer surface |
| | 118 | Chambered edge |
| | 120 | Bottom region |
| | 122 | Cylindrical body surface |
| FIG. 2 | | |
| | 200 | Wedge pin |
| | 202 | Leading taper section |
| | 204 | Top transition region |
| | 206 | Cylindrical body region |
| | 208 | Raised compression ribs |
| | 210 | Rib surface |
| | 212 | Mid transition region |
| | 214 | Tapered plug region |
| | 216 | Tapered outer surface |
| | 218 | Chambered edge |
| | 220 | Bottom region |
| | 222 | Cylindrical body surface |
| | A | Leading taper zone height |
| | B | Cylindrical body region height |
| | C | Tapered plug region height |
| | D | Bottom tapered region height |
| | E | Cylindrical body region diameter |
| | F | Rib height |
| | G | Rib displacement length |
| | H | Rib spacing |
| | I | Rib length |
| | J | Bottom plug diameter |
| | K | Tool insert region internal diameter |
| | L | Tool insert region depth |
| FIG. 3 | | |
| | 300 | Wedge pin styles |
| | 302 | Leading taper section |
| | 303 | Leading rounded section |
| | 304 | Upper transition region |
| | 306 | Cylindrical body region |
| | 308 | Raised compression ribs |
| | 312 | Mid transition region |
| | 314 | Tapered plug region |
| | 318 | Chambered edge |
| | 320 | Bottom region |
| | 324 | Bottom Transition region |
| | 326 | Bottom taper section |
| | 328 | Tool insert region |
| FIG. 4 | | |
| | 428 | Tool inserts |
| | 430 | Threaded Allen insert |
| | 432 | Allen socket |
| | 434 | Threaded cylinder insert |
| | 435 | Threaded bore receiver |
| | 436 | Twist pin insert |
| | 437 | Twist pin socket |
| | 438 | Twist pin insert tang |
| | 439 | Twist pin socket guides |
| FIG. 5 | | |
| | 500 | Wedge pin and Collar Assembly |
| | 501 | Collar |
| | | 502 Electrical cable (dual conductor) |
| | | 503 Wire A |
| | 505 | Wire B |
| | 506 | Wedge pin insert |
| | 507 | Cable compression zone |
| | 508 | Cable sheath |
| | 522 | Collar yoke portion |
| FIG. 6 | | |
| | 600 | Collar Assembly |
| | 601 | Collar |
| | 602 | Electrical cable |
| | 603 | Wire A |
| | 605 | Wire B |

APPENDIX-continued

DRAWING KEY

| | |
|---|---|
| 608 | Cable sheath |
| 610 | Smooth surfaced cable guide |
| 612 | Textured surface cable guide |
| 620 | Wedge pin insertion zone |
| 622 | Collar yoke portion |
| FIG. 7 | |
| 700 | Collar Assembly |
| 701 | Collar |
| 702 | Electrical cable |
| 703 | Wires AB |
| 705 | Wires CD |
| 706 | Wedge Pin |
| 708 | Cable sheath |
| 720 | Wedge pin insertion path |
| 722 | Collar yoke portion |
| FIG. 8 | |
| 800 | Suspended rail assembly |
| 801 | Collar |
| 802 | Electrical cable |
| 803 | Wires AB |
| 805 | Wires CD |
| 806 | Wedge Pin |
| 808 | Cable sheath |
| 822 | Collar yoke |
| 824 | Lower rail panel |
| 830 | Lens element |
| 840 | Top rail panel |

What is claimed is:

1. A cable suspension system for a light assembly comprising:

(a) a wedge pin;
wherein said wedge pin consists of an upper leading taper section transitioning to a cylindrical body region transitioning to a tapered plug region transitioning to a lower bottom region;
wherein said wedge pin has a center axis of rotation passing through a midpoint coincident to both said upper leading taper section and said lower bottom region, and extending along the length of said wedge pin;
wherein said center axis coincides with a path of insertion of said wedge pin into a collar assembly;
wherein said tapered plug region is in the form of a cone with a first diameter equal to the diameter of said cylindrical body region at the junction between said tapered plug region and said cylindrical body region, and a second diameter at a distal end of said tapered plug region larger than said first diameter;

(b) a collar assembly;
wherein said collar assembly consists of a collar portion attached to a collar yoke portion; wherein said collar portion is hollow with an upper cylindrical bore capable of accommodating one or plurality of electrical cables; wherein said electrical cables optionally have one or a plurality of wire conductors; wherein said collar yoke portion has a tapered conical bore capable of receiving and accommodating said one or plurality of electrical cables and said wedge pin; wherein said wedge pin secures said one or plurality of electrical cables within said collar assembly when inserted therein; and (c) optionally, a light assembly;
wherein said light assembly connects to said collar yoke portion of said collar assembly.

2. The cable suspension system of claim 1, wherein said upper leading taper section of said wedge pin is configured in a shape selected from a semi-hemisphere, tapered cone, semi-ovoid, rounded end, chambered end and radiused end.

3. The cable suspension system of claim 1, wherein said cylindrical body region of said wedge pin is configured in a shape selected from a straight cylinder, gradually tapered cylinder, rod and the like.

4. The cable suspension system of claim 1, wherein the outer surface of said cylindrical body region of said wedge pin features one or a plurality of raised surface features selected from a screw thread, multiple screw threads, interrupted screw threads, raised compression ribs, raised compression bumps, and combinations thereof; wherein the heights of said raised surface features above the surface of said cylindrical body region are less than or equal to a distance corresponding to one half the outer diameter of at least one wire conductor of at least one of said electrical cables.

5. The cable suspension system of claim 4, wherein the heights of said raised surface features above the surface of said cylindrical body region do not exceed a distance corresponding to the inner diameter of said upper cylindrical bore.

6. The cable suspension system of claim 4, wherein said cylindrical body region of said wedge pin features at least one of said raised surface features positioned at a midpoint along said cylindrical body region.

7. The cable suspension system of claim 4, wherein said cylindrical body region of said wedge pin features at least two of said raised surface features, equally spaced from one another and equally spaced from the top and the bottom of said cylindrical body region.

8. The cable suspension system of claim 4, wherein said cylindrical body region of said wedge pin features a plurality of said raised surface features equally spaced from one another and equally spaced from the top and the bottom of said cylindrical body region.

9. The cable suspension system of claim 1, wherein said wedge pin features a tool insert region located within said tapered plug region and having a tool access opening facing downward and outward from said lower bottom region and wherein said tool access opening is capable of receiving a tool or tool insert.

10. The cable suspension system of claim 9, wherein said tool insert is selected from a threaded insert, plug insert, friction fit insert or molded insert; wherein said tool insert is capable of receiving a tool selected from a screwdriver, Allen™ wrench, threaded bolt, threaded rod, twist pin, T-bar wrench, or the like; and wherein said tool may be inserted into said tool insert region in order to reversibly engage said wedge pin during an insertion, adjustment or removal operation.

11. The cable suspension system of claim 1, wherein said collar portion features a cylindrical bore opening capable of accommodating one or a plurality of electrical cables; wherein said collar portion transitions to the top of said tapered plug region; wherein the interior of said tapered plug region is capable of simultaneously receiving said one or a plurality of electrical cables and receiving the top end of said wedge pin; wherein an optional collar yoke portion attaches to either said collar portion or said tapered plug region of said collar assembly.

12. The cable suspension system of claim 11, wherein said collar yoke portion attaches to an outside surface or edge of said collar assembly at any one or plurality of positions thereon.

13. The cable suspension system of claim 11, wherein said collar yoke portion is integrally formed with said collar assembly as a single unit;
   wherein said collar yoke portion is optionally configured in the form of one or a plurality of flanges located at any position on the outside surface or edge of said collar assembly at any one or plurality of positions thereon.

14. The cable suspension system of claim 11, wherein said upper cylindrical bore has a surface finish selected from a dimpled, smooth, grooved, knurled and textured surface.

15. The cable suspension system of claim 11 comprising:
   (a) a collar assembly having a cylindrical body region, a tapered plug region and a collar yoke portion;
   (b) wedge pin; and
   (c) suspended rail assembly;
   wherein said suspended rail assembly is reversibly attached to said collar assembly by means of said collar yoke portion;
   wherein said collar assembly attaches to one or a plurality of vertically oriented and suspended electrical cables by means of said wedge pin being inserted between said one or plurality of wire conductors of said one or plurality of electrical cables within a compression zone located at the junction between said cylindrical bore opening and the top of said tapered plug region.

16. The cable suspension system of claim 15 wherein said suspended rail assembly comprises a light assembly having a least one light source selected from an LED, LED array, laser diode, OLED, incandescent lamp, fluorescent lamp, or combinations thereof.

17. The cable suspension system of claim 16 wherein said suspended rail assembly further features at least one or a plurality of lens elements located on any side, top or bottom portion of said suspended rail assembly.

18. The wedge pin of claim 1 wherein the body of said wedge pin comprises a metal selected from any metallic element, semi-metallic element, alloy, compound or mixture thereof; and wherein said wedge pin features an optional surface coating of a resilient non-conductive material selected from plastic, polymer, resin, Telfon or the like.

19. A means for vertically suspending a light assembly accordingly to claim 1 using said wedge pin to secure one or a plurality of suspended electrical cables inside said collar assembly; wherein said light assembly connects to an outer surface or edge of said collar assembly; and wherein one or a plurality of said wire conductors of said one or plurality of said electrical cables supply electricity to said light assembly.

20. A means for vertically suspending a light assembly according to claim 9 using a wedge pin to engage and secure a suspended electrical cable inside said collar assembly; wherein said wedge pin features a tool insert region located within said tapered plug region and having a tool access opening facing downward and outward from said lower bottom region capable of receiving a tool or tool insert; and using a tool to access said tool access opening to engage and secure said wedge pin during an operation to either insert, adjust or remove said wedge pin with respect to said collar assembly.

* * * * *